UNITED STATES PATENT OFFICE.

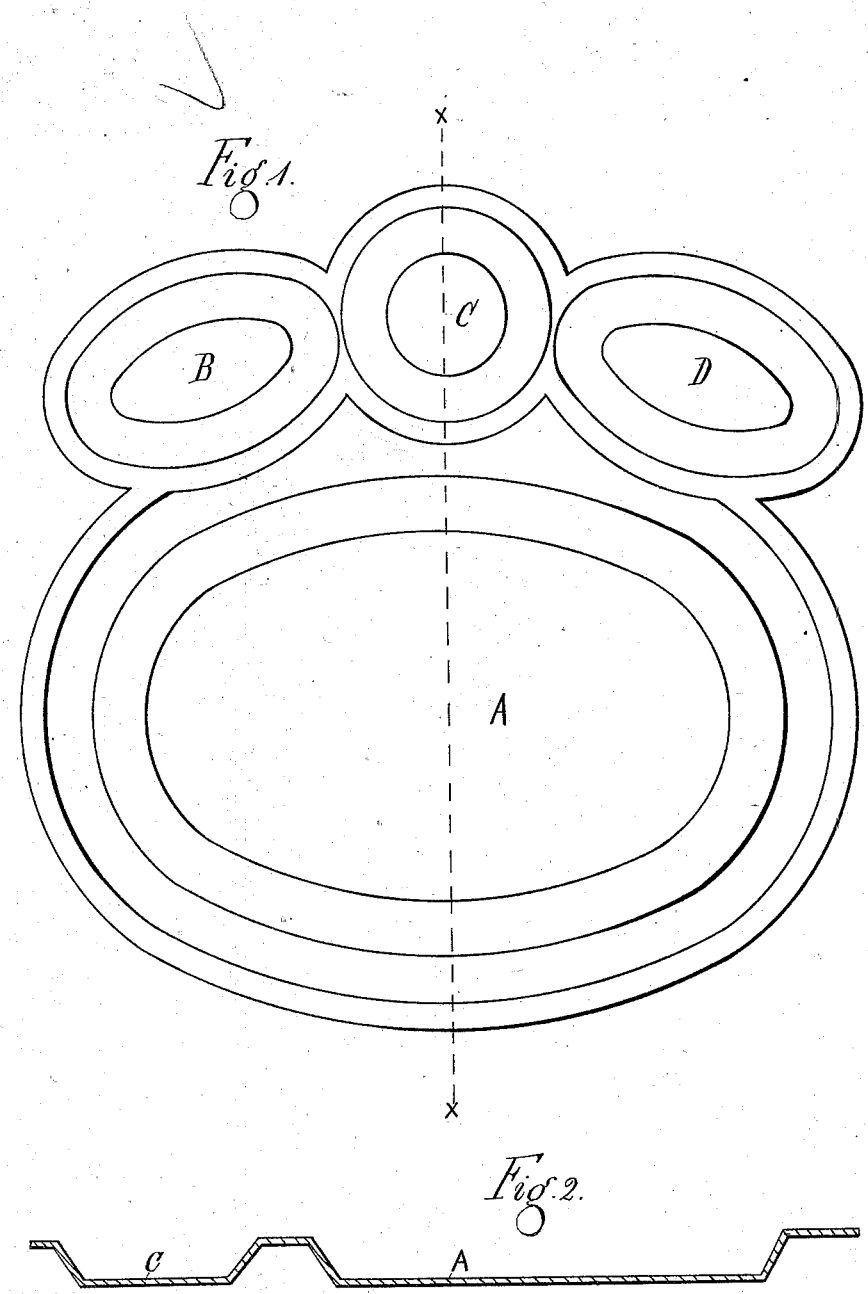

JACOB DAVID, OF BROOKLYN, ASSIGNOR OF ONE-HALF TO WILLIAM H. JOHNSON, OF NEW YORK, N. Y.

DINNER-PLATE.

SPECIFICATION forming part of Letters Patent No. 255,726, dated March 28, 1882.

Application filed August 1, 1881. (No model.)

*To all whom it may concern:*

Be it known that I, JACOB DAVID, a citizen of the United States, residing at Brooklyn, in the county of Kings, State of New York, have invented a new and useful Dinner-Plate, (for which I have not received a patent in any foreign country,) of which the following is a specification.

My invention relates to plates out of which food is to be eaten, and is a combination of the ordinary breakfast, dinner, or tea plate with the small butter-plate and small vegetable-dishes that accompany the same. By having the small butter-plate and small dishes or plates attached to the large plate, and all made together in the one piece, as hereinafter described, the same is much easier handled than one large and several small plates, and much easier carried from place to place when containing food.

Figure 1 is a top plan view. Fig. 2 is a cross-section through the main or large plate and either of the small ones.

Similar letters refer to similar parts throughout the several views.

The part marked A represents a part of the plate off which the food is to be eaten, while the parts marked respectively B, C, and D are small plates or dishes attached to and made in one piece with the large one, and are to be used to separate the different vegetables, pickles, and butter from the meat. Meat or fish can be served in the large part of the plate, (marked A,) while vegetables, pickles, and butter can be served in the compartments of the plate marked B C D, all at the same time, without the contents of one compartment or division of the plate mixing with or being in contact with each other.

The said combination-plate can be made of any suitable material similar to the common plates and dishes. I prefer to have the large part of the plate made somewhat or nearly of an oval shape, and the smaller compartments placed on one side, as shown at Fig. 1, though the same can be made of any desirable shape.

It is obvious that the plate can be divided into more compartments or divisions than shown, if desirable.

The different plates or sections A B C D are separated from each other by two separate partitions or sides, each plate or compartment having sides of its own, separated from each other by a horizontal rim that passes around and between each plate or section and connects the side of one plate or section to the sides of the other plates, leaving a space between each plate, just the same as if four separate plates were placed together and the piece of the rim of one plate was cut out to allow the outside edge of the rim of the other plate to come flush to the inside of the wall or side. The rim is extended around the outside of each plate or section and between each compartment or plate, thus having a separate side to each compartment or plate, and each section separated by a horizontal rim, as shown at Fig. 1. The sides of the different sections or plates not being vertical, but at an obtuse angle to the bottom of the plate, and having a space between each plate or section, the bottom of one plate will fit into the top of another plate of the same size, and will not slip off when piled on top of each other, and will nest in the same manner as common dinner-plates in ordinary use.

What I claim as a new article of manufacture and sale, and desire to secure by Letters Patent, is—

In a compartment dinner-plate, a horizontal rim carried around and between each section in such a manner that the compartments are divided and separated from each other in such a manner as to be in effect two or more plates attached to each other by a horizontal rim, and leaving a space between each section, compartment, or plate in such a manner that plates of the same size will fit into each other and nest when piled on top of each other, as shown and described.

JACOB DAVID.

Witnesses:
GEORGE S. ELCOCK,
E. T. WEYMOUTH.